(12) United States Patent
Richardson

(10) Patent No.: US 6,969,099 B1
(45) Date of Patent: Nov. 29, 2005

(54) CONTAINER LIFTING DEVICE, RACK AND METHOD

(76) Inventor: Wayne R. Richardson, 1350 Forest Acre Cir., Pleasant Garden, NC (US) 27313

( * ) Notice: Subject to any disclaimer, the term of this patent is extended or adjusted under 35 U.S.C. 154(b) by 192 days.

(21) Appl. No.: 10/356,994

(22) Filed: Feb. 3, 2003

(51) Int. Cl.$^7$ ................................................ B66C 1/28
(52) U.S. Cl. .................................... 294/87.22; 294/143
(58) Field of Search ..................... 294/28, 31.1, 87.22, 294/87.24, 106, 137, 145, 162, 163, 169, 294/142, 143

(56) References Cited

U.S. PATENT DOCUMENTS

| | | | |
|---|---|---|---|
| 1,592,286 A | | 7/1926 | Rymarz |
| 1,631,598 A | | 6/1927 | Lehr |
| 2,051,481 A | * | 8/1936 | Hudson .................... 294/87.24 |
| 2,138,498 A | | 11/1938 | McMillan |
| 2,140,314 A | | 12/1938 | Doscher |
| 2,378,026 A | * | 6/1945 | Morgan ................... 294/87.22 |
| 2,398,747 A | * | 4/1946 | Keith et al. .............. 294/87.24 |
| 2,441,494 A | | 5/1948 | Larmett |
| 2,516,785 A | | 7/1950 | Mercer |
| 2,520,203 A | | 8/1950 | Havwa |
| 2,655,402 A | | 10/1953 | Johnson |
| 2,680,041 A | | 6/1954 | Gribskov |
| 3,126,222 A | | 3/1964 | Stuart |
| 4,545,608 A | | 10/1985 | Dodd |
| 4,807,917 A | * | 2/1989 | Bunting ................... 294/87.24 |
| 4,889,245 A | | 12/1989 | Rinke |
| 4,911,288 A | | 3/1990 | Dantoin, Jr. |
| 5,048,884 A | * | 9/1991 | Cline ...................... 294/87.24 |
| 5,551,565 A | | 9/1996 | Kendrick |
| 6,312,032 B1 | | 11/2001 | Richardson |

FOREIGN PATENT DOCUMENTS

GB 707398 4/1954

OTHER PUBLICATIONS

Nektrackers, cooler rack for grasping and holding bottle necks, undated, two pictures (P1, P2).
Drawing of a can/bottle combination lifter, undated.
Drawing of a "Key hole" bottle lifter unit for four bottles, undated.
Photo of 20/12 lifter with strap undated.
Photo of 20/6 lifter undated.
Photo of wooden lifter undated.

* cited by examiner

Primary Examiner—Dean J. Kramer

(57) ABSTRACT

A device for lifting multiple containers, such as beverage bottles from a carton, which allows for quick and easy loading of refrigerated cooler racks. The cooler racks are devised to cooperatively engage guides on the lifting device so the bottles can be transferred from the lifting device to the racks by the influence of gravity. The method of cooler rack loading allows a worker to efficiently unload beverage cartons and load cooler racks at 4 to 5 times the usual speed with less loss and damage over conventional manual loading methods. The lifting device includes a pair of pivotable, elongated gates which engage the necks of the beverage bottles during lifting and transferring to the cooler racks.

13 Claims, 10 Drawing Sheets

CONTAINER LIFTING DEVICE, RACK AND METHOD

FIELD OF THE INVENTION

The invention herein pertains to loading refrigerated coolers and particularly pertains to loading inclined refrigerated cooler racks with multiple beverage bottles simultaneously using a lifting device for the bottles.

DESCRIPTION OF THE PRIOR ART AND OBJECTIVES OF THE INVENTION

Convenience, grocery and other stores have long used "walk-in" type coolers from which refrigerated goods can be selected and removed by shoppers through one or more glass front doors. Such walk-in coolers are sized with a large, rear storage area and at the front of the cooler, shelves or racks are positioned with beverages and other refrigerated items thereon. Shopper access to the racks is usually achieved through front doors which are hinged and can be opened by shoppers when selecting various goods. Cartons and cases of refrigerated goods maintained within the rear storage area of the cooler are opened as needed for stocking the cooler racks and shelves. The goods are conventionally, manually removed from the carton and placed on the shelves as needed. Twenty ounce soft drink beverages are one of the items that convenience and other stores maintain for their customers. During busy seasons, such as hot summer days the available cooler shelves and racks must be constantly restocked to satisfy the demands of the shoppers. Removing beverage bottles or other goods by hand from the cartons during shelf restocking is labor intensive and can be a large expense for smaller stores. Inexperienced workers often drop beverage bottles and other containers as they are being hand loaded, sometimes damaging the containers and making them unsaleable.

Thus, with the problems and disadvantages of current cooler rack loading techniques, the present invention was conceived and one of its objectives is to provide a manual lifting device whereby a plurality of containers can be safely, simultaneously lifted by a worker restocking cooler racks.

It is also an objective of the present invention to provide a lifting device which will allow multiple containers such as beverage bottles to be quickly and securely engaged for rack loading purposes.

It is a further objective of the present invention to provide a lifting device which is relatively inexpensive to manufacture and its operation and use easily learned by unskilled workers.

It is yet another objective of the present invention to provide a rack for placement in a refrigerated cooler for holding a number of beverages or other containers for cooperative use with a lifting device.

It is still yet another objective of the present invention to provide racks for holding containers which can be easily installed into refrigerated coolers after the removal of standard shelves and racks.

It is also an objective of the present invention to provide a method for loading a refrigerated cooler utilizing a lifting device and a rack which cooperatively engage for speed in loading and rack restocking.

Another objective of the invention is to provide a cooler rack which will provide a stable, upright beverage bottle for ease in selection by a shopper.

Still another objective of the invention is to provide a cooler rack whereupon bottles slide on cylindrical rods which help prevent sticking and jamming of the bottles.

Various other objectives and advantages of the present invention will become apparent to those skilled in the art as a more detailed description is set forth below.

SUMMARY OF THE INVENTION

The aforesaid and other objectives are realized by providing a lifting device having one or more elongated, pivotable gates for placement atop a row of beverage bottles or containers such as in a carton. Applying a downward force to the lifting device allows the gates of the lifting device to open and grasp the necks of the beverage bottles or containers to hold them securely during transfer.

The cooler rack described in the invention includes a pair of parallel rails, which grasp the bottle necks, consisting of cylindrically shaped rods held in opposing side-by-side relation by a series of inverted U-shaped connectors affixed thereto. The racks are suspended on an incline from posts or other structures within a conventional refrigerated cooler and define an exit end proximate the front or customer door of the cooler and an entry or loading end within the cooler for bottle restocking purposes. The rack entry end includes a "fence" which cooperatively receives the guides of the lifting device. Once the lifting device has grasped, for example six beverage bottles, it is then placed into engagement with the rack by inserting the guides of the lifting device into the fences on the entry end of the rack. With the lifting device and rack engaged on an incline, the beverage bottles will then slide along the cylindrical rods of the rails due to the influence of gravity and transfer from the lifting device to the rack. The cooler provides a rest attached to a post, forward of the rack proximate the front door to allow a resting point for the leading beverage bottle. As a shopper removes the rested bottle, gravity urges the remaining bottles on the inclined rack to slide forward, along the rails whereby the leading bottle will depart the exit end of the rack and settle on the rest, again giving easy accessability to the shopper.

In the method of cooler rack restocking, the bottle loaded lifting device is positioned along the inclined alignment of the rack in order for the bottles to easily transfer. A pair of hooks positioned on the lifting device engages the fence at the entry end of the rack, assuring that the lifting device and rack are properly, linearly aligned for efficient bottle transfer.

DETAILED DESCRIPTION OF THE PREFERRED EMBODIMENTS AND OPERATION OF THE INVENTION

Figure 1:
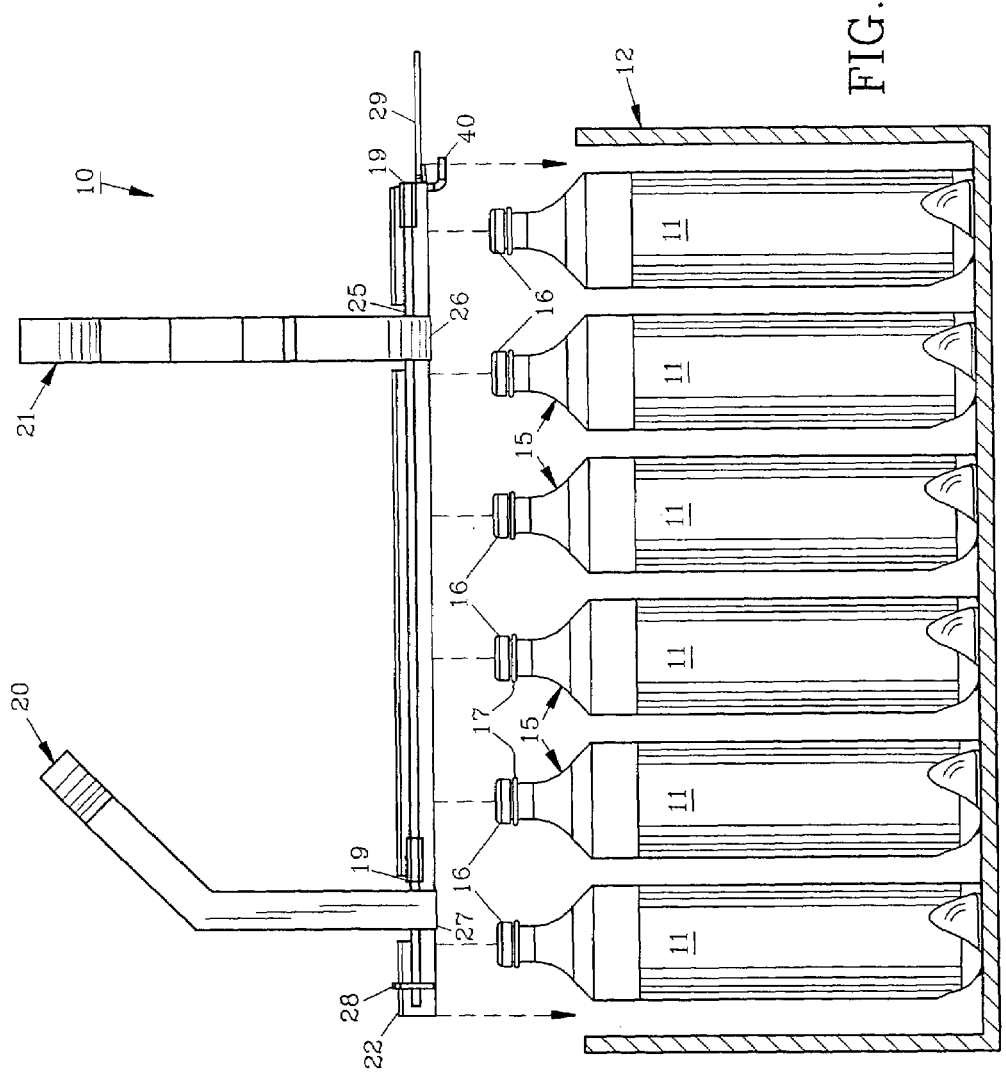
FIG. 1 shows a side view of the lifting device of the invention above a row of beverage bottles.

For a better understanding of the invention and method of use, turning now to the drawings, FIG. 1 shows preferred bottle lifting device 10 positioned over a conventional carton 12 (seen in cross section and cut-away) containing 24 (4 rows of 6 bottles) soft drink beverage bottles 11. In FIG. 1 only one (1) row of six (6) bottles 11 is shown. Bottles 11 include narrow neck area 15 with neck ring 17 and cap 16 as conventional. To lift bottles 11 for transfer into a refrigerated drink cooler or the like, bottle lifting device 10 is urged downwardly by manually grasping rear handle 20 with one hand and front handle 21 with the other hand. As shown herein, preferred bottle lifting device 10 will accommodate six (6) conventional twenty-ounce beverage bottles 11 although other sizes and capacities of lifting device 10 could be manufactured as desired. Alternate bottles 18 shown in FIG. 10 are conventional two-liter beverage bottles.

Figure 2:
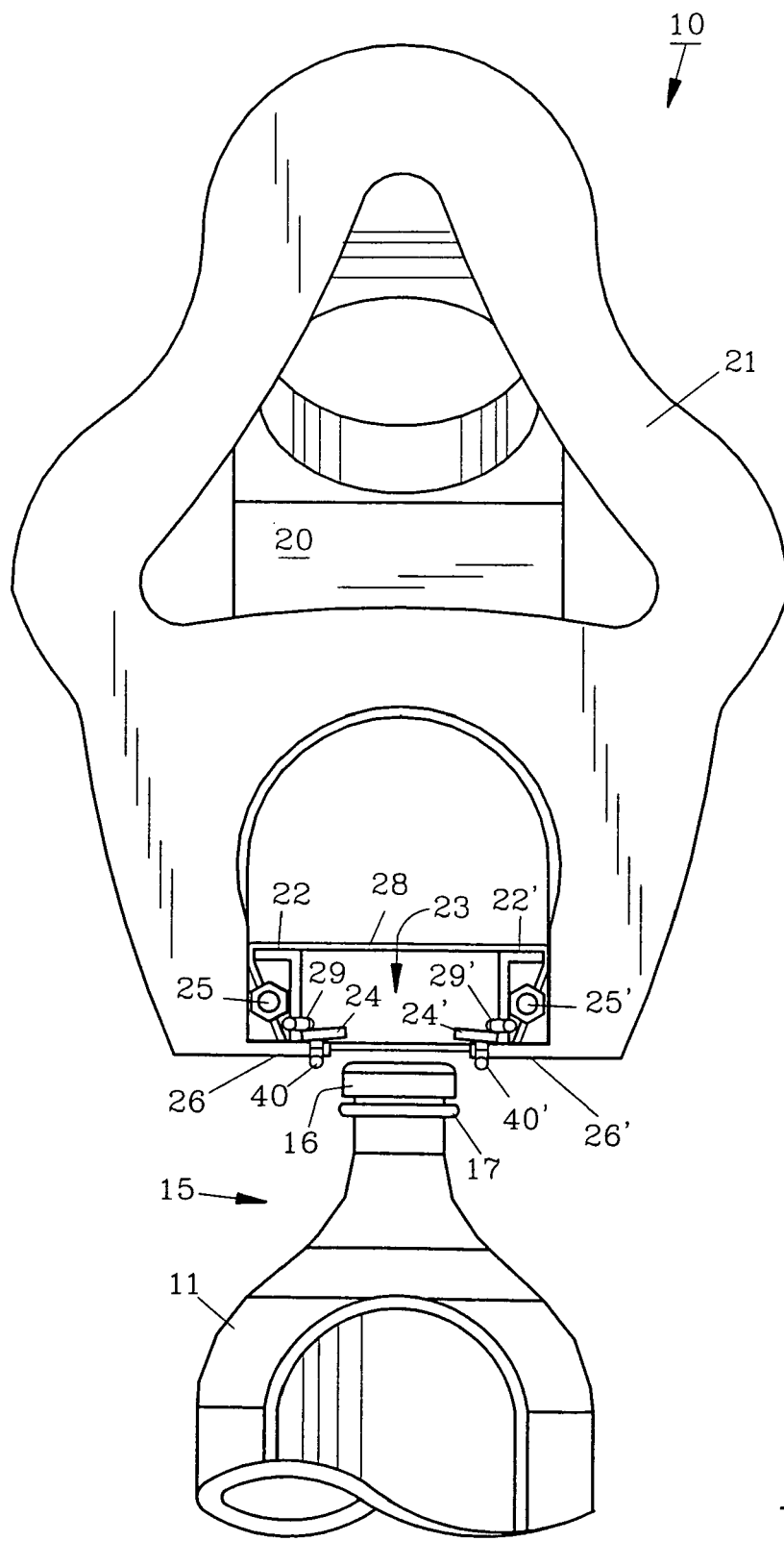
FIG. 2 demonstrates an enlarged front view of the lifting device as moving downwardly, just prior to contact with a beverage bottle.

In FIG. 2, downward motion of bottle lifting device 10 causes pivotable, opposing, elongated Z-shaped gates 22, 22', having feet 24, 24' respectively, to make contact with cap 16. Opening 23, shown in FIGS. 2, 6 and 9 between gate feet 24, 24', is less than the diameters of cap 16 and neck ring 17 of neck 15. From either side of tension device 28, opening 23 extends continuously through the bottom and each of the sides of lifting device 10. Feet 24, 24' of Z-shaped gates 22, 22' respectively have a slightly upward bias of about 10 degrees to assist the entry of bottle cap 16 and neck 15 from below the same. Gates 22, 22' are attached to collars 19, 19' and pivot about axles 25, 25' as shown enlarged in FIG. 9 which are attached to handles 20, 21. Handles 20, 21 extend below feet 24, 24' to terminate the downward rotational movement of feet 24, 24'.

Figure 3:
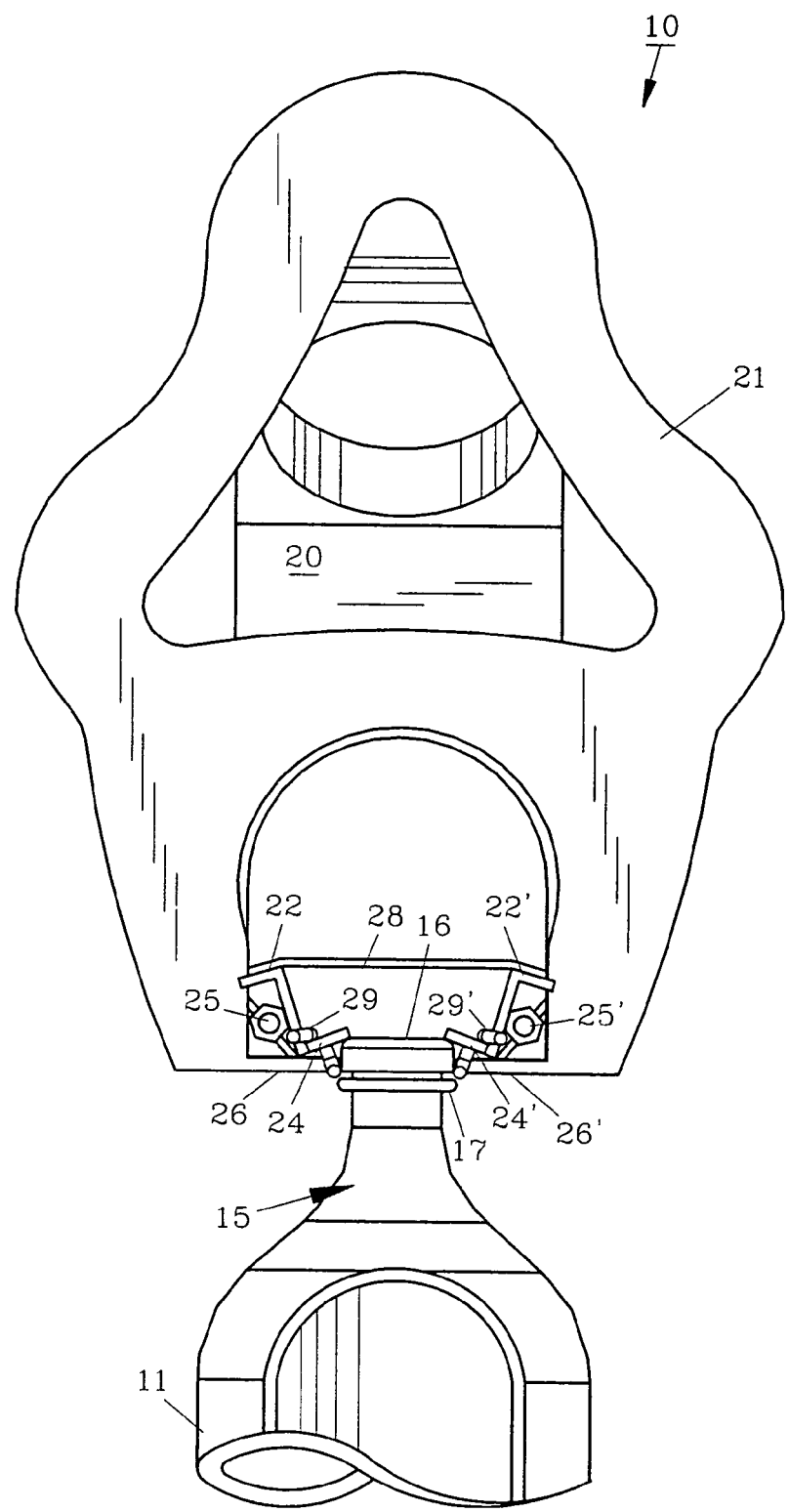
FIG. 3 illustrates the lifting device of FIG. 2 with the gates simultaneously open as the bottle is urged therein.
Figure 4:
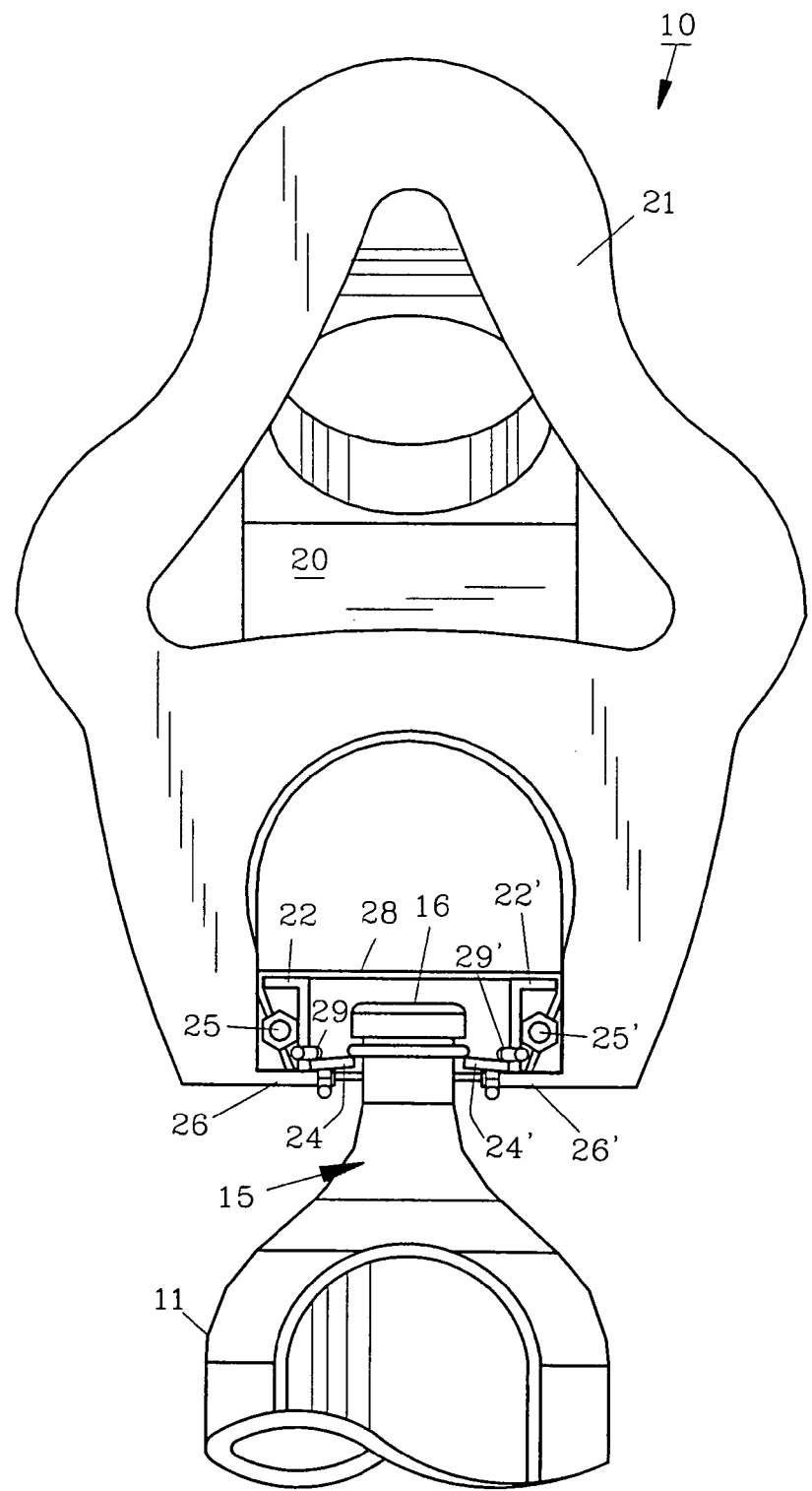
FIG. 4 depicts the lifting device of FIG. 2 with the bottleneck fully inserted therein for lifting the bottle and loading the cooler rack.
Figure 5:
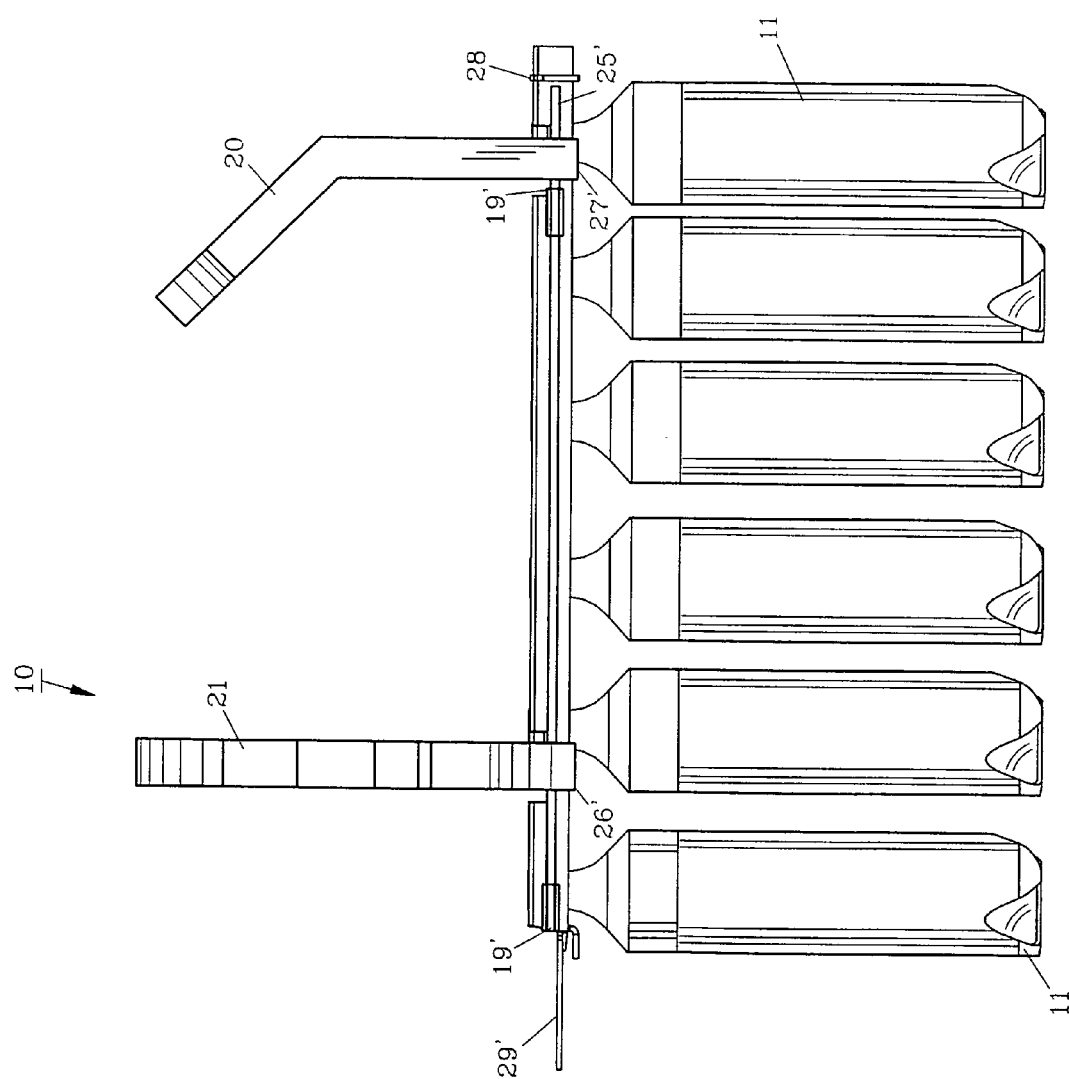
FIG. 5 pictures a side view of the lifting device loaded with six (6) beverage bottles.
Figure 6:
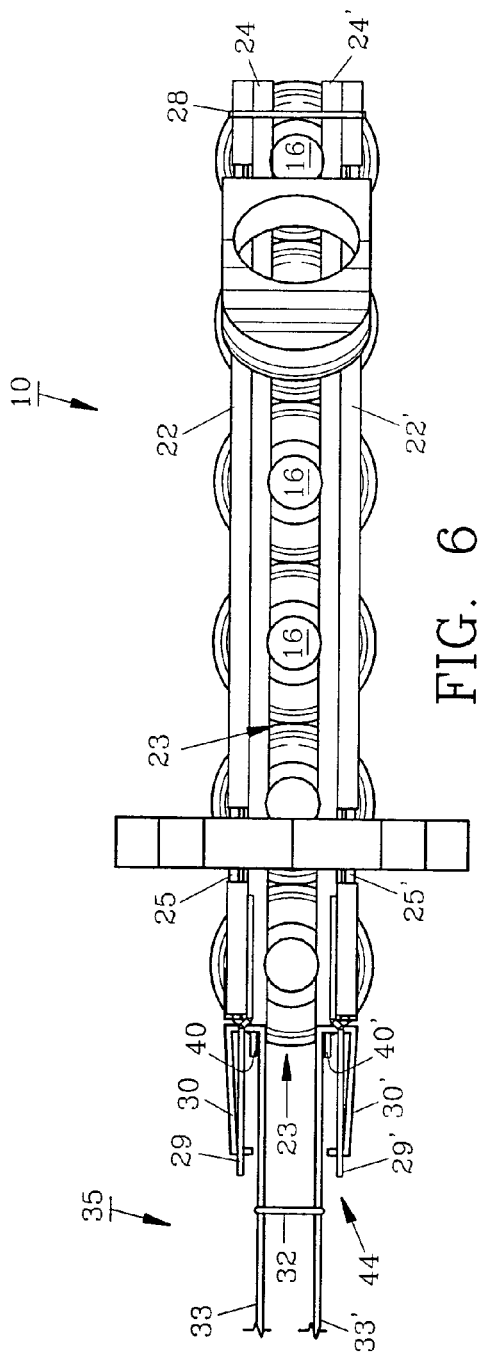
FIG. 6 features a top view of the lifting device as shown in FIG. 5 inserted into a rack (fragmented)

Continued downward pressure applied to lifting device 10 as shown in FIG. 2 against bottles 11 causes elongated gates 22, 22' to pivot counter-clockwise and clockwise respectively about axles 25, 25' and widens opening 23 as seen in FIG. 3 until cap 16 and neck ring 17 move past feet 24, 24' as shown in FIG. 4. Feet 24, 24' "snap" past cap 16 and neck ring 17 as they return, thereupon engaging neck ring 17 from below, also seen in FIG. 4. Gates 22, 22' are tensioned to return to the substantially dormant position as shown in FIG. 2 by tension member 28 shown in FIG. 1 where they rest on handle shelves 26, 26' of front handle 21 and handle shelves 27, 27' (27' shown in FIG. 7) of rear handle 20. Tension member 28 is preferably an elastomeric band which encircles the ends of gates 22, 22' contiguous rear handle 20 as shown in FIGS. 1, 5 and 6. Metal springs or other tension means may be used but are not preferred. Thus, once cap 16 and neck ring 17 moving upwardly clear feet 24, 24', tension member 28 returns pivotable gates 22, 22' to the dormant position seen in FIGS. 4 and 6 to slideably hold bottles 11 on feet 24, 24' within lifting device 10. A worker can quickly engage six (6) bottles 11 with one downward motion of lifting device 10 and thereafter lift bottles 11 slideably supported on feet 24, 24' therein for transfer to rack 35, as seen in FIGS. 6 and 7, whereby longitudinally tilting lifting device 10 allows bottles 11 engaged therein to slideably exit the same along feet 24, 24'.

Figure 10:
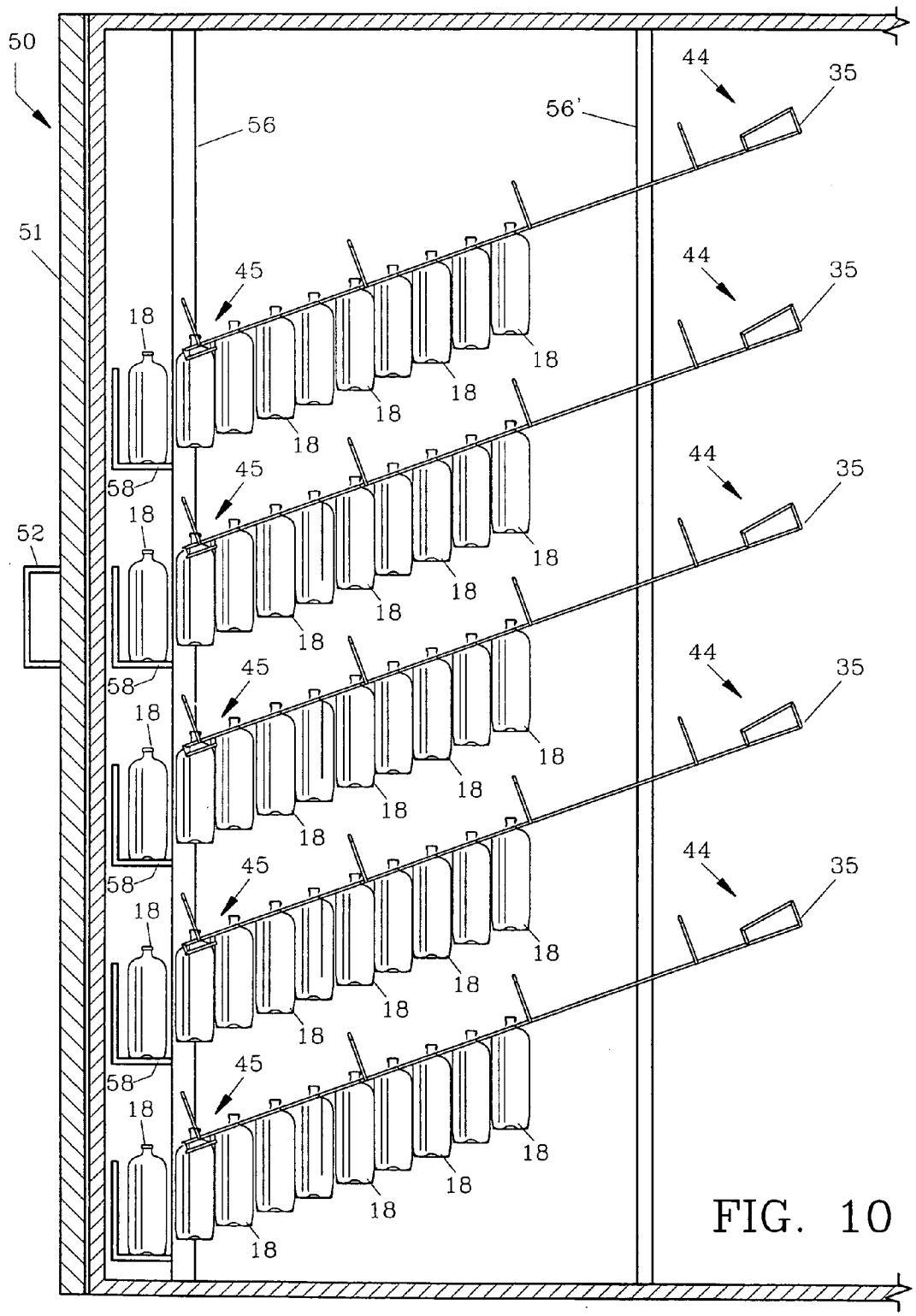
FIG. 10 pictures a cross-sectional side view of a refrigerated cooler with the racks of the invention therein.

In FIG. 10 a typical refrigerated cooler 50 is shown having a front customer access door 51 with handle 52 affixed for opening the same. Door 51 pivots with a series of hinges (not shown) as conventional. Cooler 50 is a standard walk-in type having an area large enough for employees to walk behind racks 35, within refrigerated cooler 50 for rack stocking purposes. As further shown, racks 35 are seen suspended within cooler 50 as by affixing to two (2) vertical posts 56, 56'. Racks 35 are affixed to posts 56, 56' at an angle of approximately 20 degrees to allow bottles 18 or other similarly shaped bottles such as bottles 11 (see FIG. 7) supported on rails 33, 33' to slide by gravity toward front access door 51. Bottles 18, when loaded on rack 35, slide forward toward exit end 45 of rack 35 and exit the same one at a time, onto L-shaped rest 58, also attached to post 56. L-shaped rest 58 provides easy accessibility to bottle 18 for a patron and upon removal, gravity urges the next adjacent bottle 18 to then slide forwardly to exit rack 35 and to then stop on rest 58 where it becomes accessible to the next patron. In FIG. 10, only five (5) racks 35 are shown in a vertical column but as would be understood, as many racks 35 as suitable could be placed in cooler 50. Likewise, the vertical spacing of racks 35 are dependant on the size of the cooler and the bottle height and can be configured in different ways depending on the particular demands specified. Also, any number of rows of columns of racks could be utilized, depending on the width and height of a particular cooler.

Figure 7:
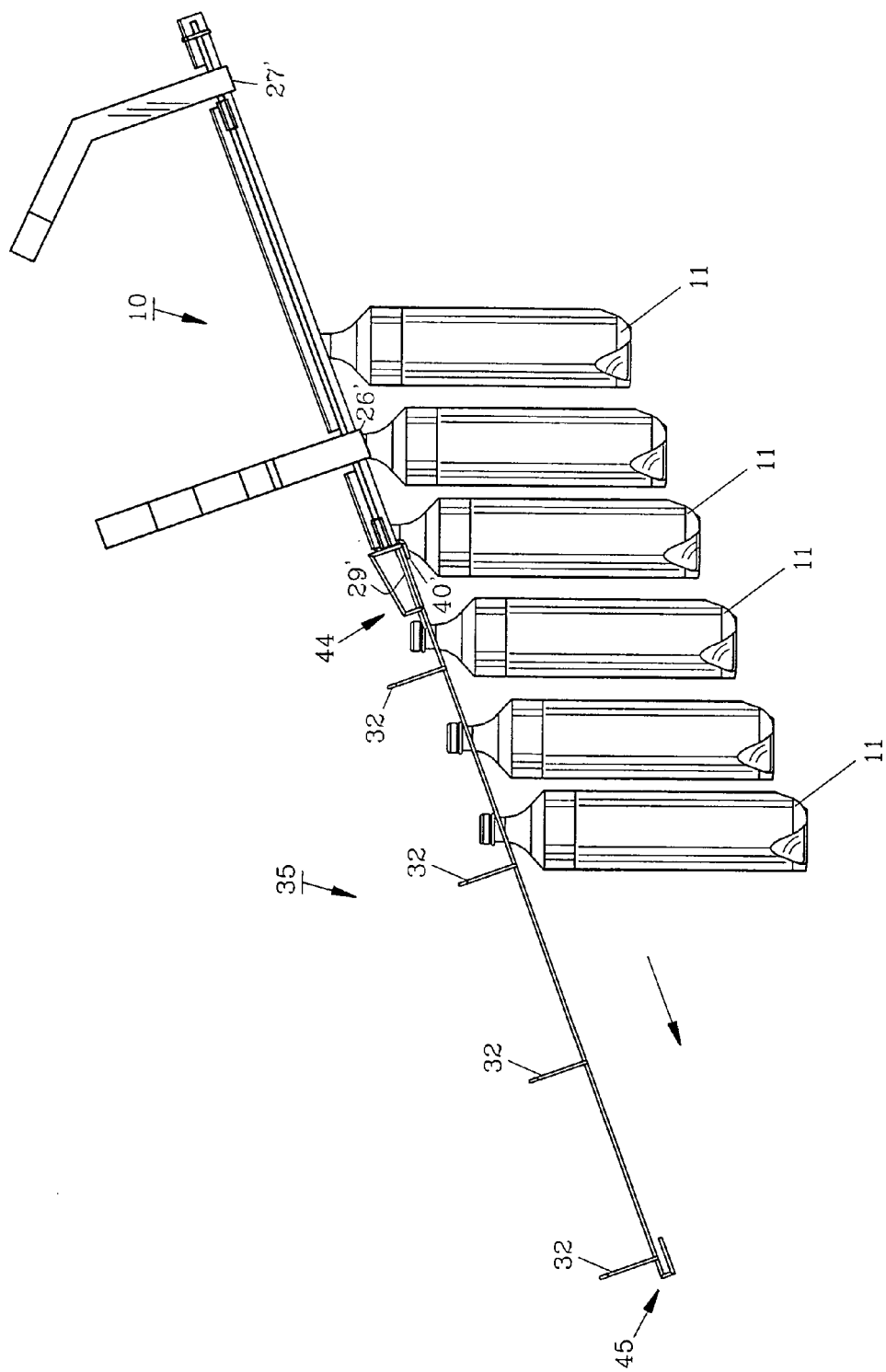
FIG. 7 shows the lifting device as seen in FIG. 6 with the beverage bottles transferring to the rack.
Figure 8:
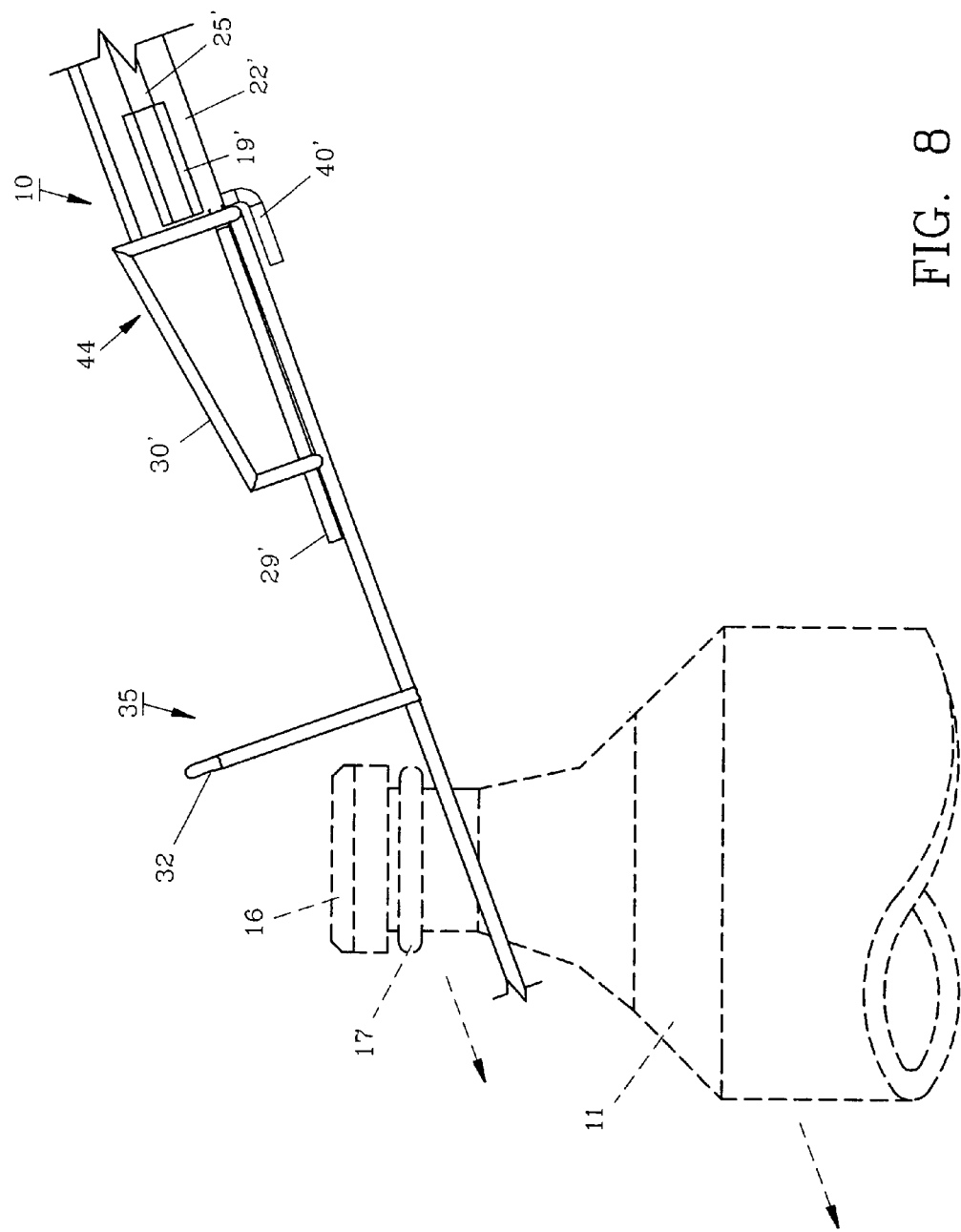
FIG. 8 is an enlarged, fragmented view of the lifting device and rack during bottle transfer.
Figure 9:
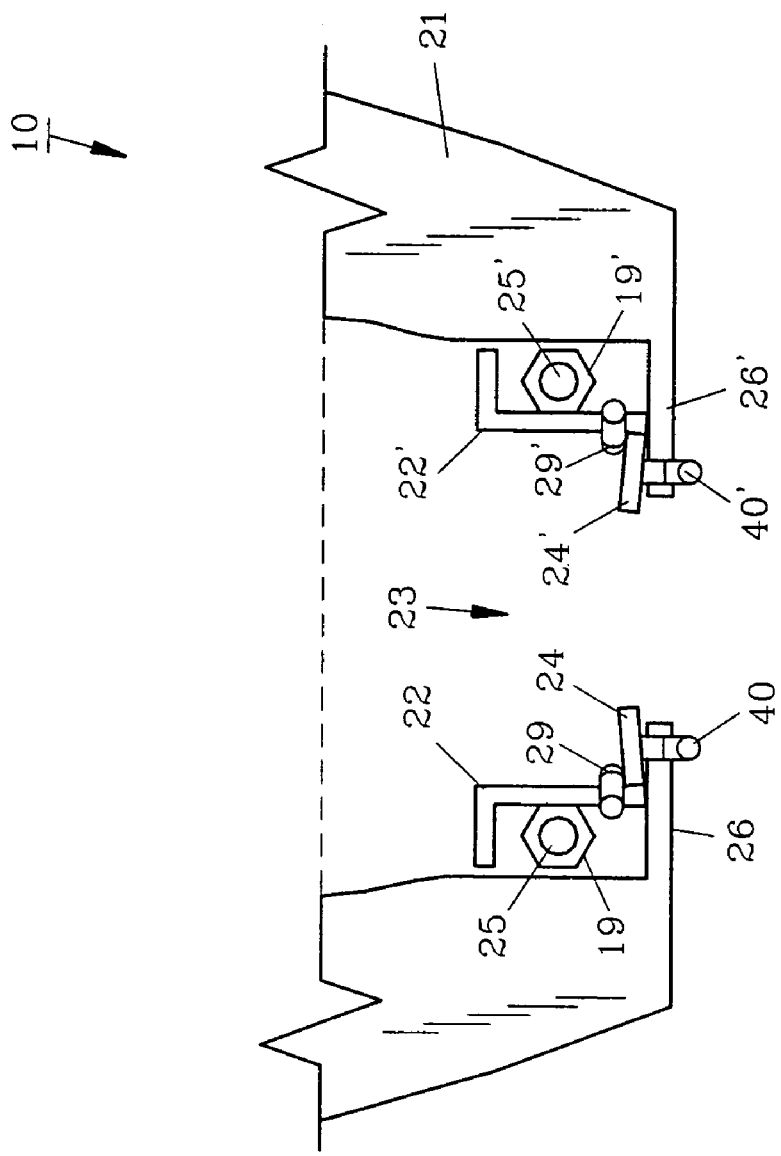
FIG. 9 depicts the lifting device of FIG. 2 fragmented and further enlarged with the tension means and beverage bottle removed therefrom.

Once lifting device 10, as shown in FIGS. 5 and 6, is loaded with bottles 11, the next step in the preferred method of use is to transfer bottles 11 onto racks 35 as shown in FIGS. 7 and 8. Lifting device 10 allows this to be quickly completed with the use of rack guides 29, 29' attached thereto as shown for example in FIGS. 6, 7, 8 and 9 (only rack guide 29' shown in FIGS. 7 and 8). Rack guides 29, 29' are metal rods which are connected such as by welding to or forming with respectively, gates 22, 22' as shown in FIG. 9. Guides 29, 29' engage rack fences 30, 30' of rack 35 and rest thereon on entry end 44 of rack 35 as shown in FIGS. 6, 7 and 8 (guide 29 and rack fence 30 are shown in FIG. 6) to properly align feet 24, 24' with parallel rails 33, 33' of rack 35 for slideably directing bottles 11 between lifting device 10 and rack 35. It should be noted that preferred rack 35 has fences 30, 30' which are angled to form a wedge-shaped opening to assist entry of guides 29, 29' while limiting the lateral movement of guides 29, 29' within fences 30, 30'. Fences 30, 30' are attached or are formed with parallel rails 33, 33' respectively. Bottles 11 are slideably received on rails 33, 33' which are supported and maintained spaced from one another by inverted unshaped connectors 32 as shown in FIGS. 6, 7 and 8 (rail 33 shown in FIG. 6). Connectors 32 are designed to allow bottle caps 16 to readily pass thereunder.

Figure 11:
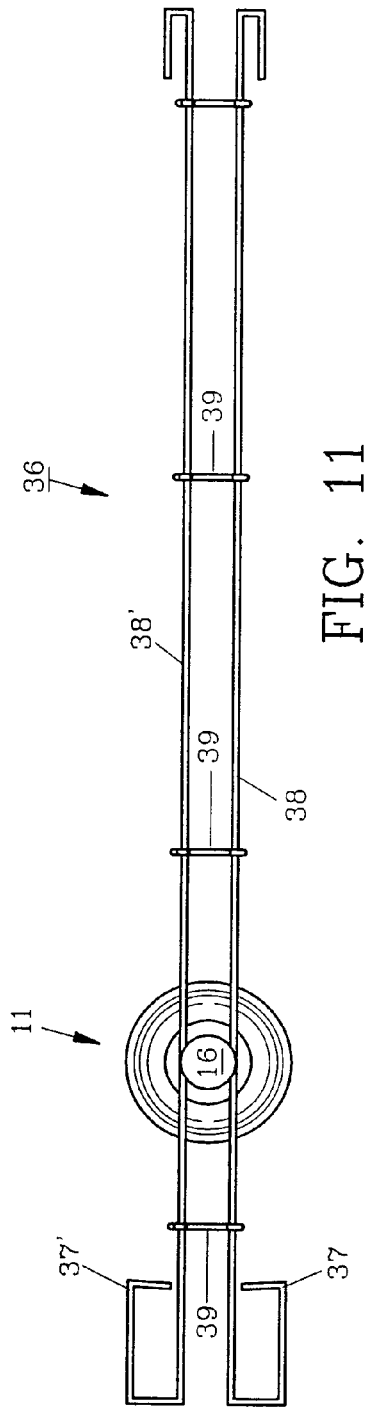
FIG. 11 demonstrates an alternate embodiment of a cooler rack.

In an alternate embodiment, rack 36, as shown in FIG. 11, includes fences 37, 37' which are parallel but are not preferred. Rack 36 includes parallel rails 38, 38' comprising cylindrical metal rods for low friction and spaced for containing bottle neck rings 17 thereon as hereinbefore described for rack 35. Supports 39 are sized with a height to allow cap 16 to pass thereunder while maintaining cylindrically shaped rails 38, 38' in a rigid parallel configuration.

In FIG. 9, hook 40 is affixed to gate 22 on foot 24 depending from the end thereof contiguous front handle 21. Hook 40' is also shown in FIG. 9 attached to foot 24' of gate 22'. Hooks 40, 40' allow lifting device 10 to remain in a longitudinally aligned (inclined) position such as with preferred rack 35 as shown in FIG. 8 (only hook 40' shown). Hooks 40, 40' engage fences 30, 30' of rack 35 respectively or fences 37, 37' of rack 36 shown in FIG. 11. This engagement of hooks 40, 40' with racks 35 or 36 maintains both the longitudinal, inclined alignment of racks 35 or 36 and lifting device 10 and prevents lifting device 10 from engaging rack 35 or 36 at an undesirable inclined angle. This assists in the rapid transfer of bottles 11 from lifting device 10 to, for example rack 35 of cooler 50 in a smooth, efficient slideable manner. Hooks 40, 40' also act as stops, preventing further penetrating engagement of, for example fences 30, 30' and guides 29, 29' respectively from the end thereof.

The preferred method of the invention provides easy loading of cooler racks, as with preferred rack 35 shown in FIG. 10. The method steps include placing lifting device 10 atop a row of beverage bottles, such as bottles 11 seen in FIG. 1. By manually urging lifting device 10 downwardly with both hands, lifting device 10 grasps bottles 11 as gates 22, 22' allow passage of caps 16 and engage necks 15 including neck rings 17 of bottles 11. Bottle loaded lifting device 10 is then placed into longitudinal (inclined) alignment with rack 35, as seen in FIG. 7, as guides 29, 29' penetrate fences 30, 30'. Hooks 40, 40' help maintain alignment between rack 35 and lifting device 10 and act as stops as hooks 40, 40' engage respectively, fences 30, 30'. Bottles 11 then transfer to rack 35 by sliding along feet 24, 24' onto cylindrically shaped rails 33, 33' as seen in FIG. 6. On initial transfer of bottles onto rack 35, the leading bottle will slide down along rails 33, 33' and exit rack 35 to set on L-shaped rest 58 (FIG. 10) for selection by a shopper such as bottles 18.

The illustrations and examples provided herein are for explanatory purposes and are not intended to limit the scope of the appended claims.

I claim:

1. A lifting device for bottles with a neck comprising: a first elongated gate, a second elongated gate, said first elongated gate in opposing spaced relationship with said second elongated gate defining an opening therebetween, said opening between said gates extending through one end of said lifting device, said bottle necks receivable in said opening, said first and said second elongated gates for slideably supporting said bottle necks thereon, a first handle, said first handle joined to said first and said second elongated gates, and said first elongated gate pivotally attached to said first handle whereby said bottles can be slidably directed from said lifting device along said gates to exit said lifting device through the open end.

2. The lifting device of claim 1 wherein said second elongated gate is pivotally attached to said first handle.

3. The lifting device of claim 1 further comprising a means to tension said first elongated gate, said tension means attached to said first elongated gate.

4. The lifting device of claim 3 wherein said tension means is resilient.

5. The lifting device of claim 1 wherein said first elongated gate is Z-shaped.

6. The lifting device of claim 1 further comprising a guide, said guide attached to said first elongated gate whereby said guide aligns said lifting device for slideably directing said bottles therefrom.

7. The lifting device of claim 1 wherein said first handle surrounds each of said elongated gates to limit rotation thereof.

8. The lifting device of claim 1 further comprising a second handle, said second handle spaced from said first handle, a pair of axles, said axles attached to said first and said second handles, said first and said second elongated gates pivotally attached to different ones of said axles.

9. A lifting device for a container having a neck comprising: first and second elongated gates, said first and said second elongated gates for slideably supporting said container thereon, a first handle, said first and said second elongated gates pivotally joined to said first handle, said first and said second elongated gates positioned in parallel relation to define an opening therebetween to receive the neck of said container, said opening extending through one end of said lifting device to allow said container to exit therefrom, whereby upon pivoting said elongated gates said opening therebetween widens.

10. The lifting device of claim 9 further comprises a means to tension said elongated gates, said tension means attached to said first and said second elongated gates.

11. The lifting device of claim 10 wherein said tension means is elastomeric.

12. The lifting device of claim 11 further comprising a first stop, said first stop attached to one of said elongated gates, said stop for limiting the engagement of said lifting device with a container rack.

13. The lifting device of claim 9 further comprising a pair of, axles, said axles each attached to different ones of said elongated gates.

* * * * *